United States Patent
Beldrighi et al.

(10) Patent No.: US 11,208,026 B2
(45) Date of Patent: Dec. 28, 2021

(54) CONVERTIBLE VEHICLE FOR GOODS TRANSPORTATION

(71) Applicant: GBS DI BELDRIGHI GRAZIANO, Bagnolo Mella (IT)

(72) Inventors: Graziano Beldrighi, Bagnolo Mella (IT); Claudio Miglioli, Bagnolo Mella (IT)

(73) Assignee: GBS DI BELDRIGHI GRAZIANO, Bagnolo Mella (IT)

( * ) Notice: Subject to any disclaimer, the term of this patent is extended or adjusted under 35 U.S.C. 154(b) by 26 days.

(21) Appl. No.: 16/630,724

(22) PCT Filed: Jul. 20, 2018

(86) PCT No.: PCT/IB2018/055412
§ 371 (c)(1),
(2) Date: Jan. 13, 2020

(87) PCT Pub. No.: WO2019/016770
PCT Pub. Date: Jan. 24, 2019

(65) Prior Publication Data
US 2021/0094456 A1     Apr. 1, 2021

(30) Foreign Application Priority Data
Jul. 20, 2017  (IT) ........................ 102017000082513

(51) Int. Cl.
*B60P 1/16*     (2006.01)
*B60P 3/42*     (2006.01)
(Continued)

(52) U.S. Cl.
CPC .............. *B60P 3/42* (2013.01); *B60P 1/165* (2013.01); *B61D 3/04* (2013.01); *B65G 67/24* (2013.01);
(Continued)

(58) Field of Classification Search
CPC .. B60P 1/165; B60P 3/42; B60P 3/426; B61D 3/04; B62D 53/067; B65G 2201/06
(Continued)

(56) References Cited

U.S. PATENT DOCUMENTS 822,360 A * 6/1906 Gilchrist ................. B60P 1/165
                                                        298/17.6
1,013,789 A * 1/1912 Longest .................. B60P 1/165
                                                        298/18
(Continued)

FOREIGN PATENT DOCUMENTS

IT  102017000015045  2/2017
WO  2012123008 A1    9/2012

OTHER PUBLICATIONS

International Search Report and Written Opinion dated Oct. 26, 2018 from counterpart PCT App No. PCT/IB2018/055412.

*Primary Examiner* — James Keenan
(74) *Attorney, Agent, or Firm* — Carmel Patent Agency; Robert J. Ballarini

(57) ABSTRACT

A convertible load platform for a vehicle for transporting goods on wheels or on rails includes a main frame, at least one loading device integrated with the main frame and convertible, and tipping means for tipping a support base of the device, so as to obtain the unloading of bulk material contained in the bag from one of the sides of the frame.

13 Claims, 12 Drawing Sheets

(51) Int. Cl.
  *B61D 3/04* (2006.01)
  *B65G 67/24* (2006.01)
(52) U.S. Cl.
  CPC ...... *B65G 2201/04* (2013.01); *B65G 2201/06* (2013.01)
(58) Field of Classification Search
  USPC ............................ 105/243; 296/10; 414/470
  See application file for complete search history.

(56) References Cited

U.S. PATENT DOCUMENTS

| | | | | |
|---|---|---|---|---|
| 2,071,620 A | * | 2/1937 | Fitch | B61D 3/005 |
| | | | | 105/243 |
| 3,583,330 A | * | 6/1971 | Freudman | B61D 5/002 |
| | | | | 105/239 |
| 3,595,175 A | * | 7/1971 | Austill | B61D 3/06 |
| | | | | 105/243 |
| 4,557,400 A | * | 12/1985 | Clarke | B60P 1/56 |
| | | | | 105/243 |
| 4,606,570 A | | 8/1986 | Neumann | |
| 4,861,215 A | | 8/1989 | Bonerb | |
| 4,946,214 A | * | 8/1990 | Neumann | B65D 88/005 |
| | | | | 105/243 |
| 8,066,135 B2 | * | 11/2011 | Albers | B60P 3/426 |
| | | | | 220/1.6 |
| 10,717,380 B2 | * | 7/2020 | Adams | B62D 53/067 |

* cited by examiner

CONVERTIBLE VEHICLE FOR GOODS TRANSPORTATION

This application is the National Phase of International Application PCT/IB2018/055412 filed Jul. 20, 2018 which designated the U.S.

This application claims priority to Italian Patent Application No. 102017000082513 filed Jul. 20, 2017, which application is incorporated by reference herein.

FIELD OF THE INVENTION

The present invention relates to the field of vehicles for the goods transportation, and in particular it relates to a convertible vehicle which can also be used for the transport of bulk material, such as cereals and the like. In particular, an object of the present invention is a loading platform, usable in the field of vehicles on wheels or on rails.

BACKGROUND

As is known, road transport of goods is enormously widespread, despite awareness campaigns for the use of rail, sea or air transport.

In the case of the transport of bulk materials, for example cereals, it is necessary to load the material in appropriate containers, placed on the lorry or truck platform. Once at destination, the containers are emptied. Empty containers must then be sent back.

There is therefore a need to optimize container transport and material loading and unloading operations in order to minimize costs. A solution to this problem is illustrated, for example, in the Italian patent application for invention No. 10 2017 000 015 045, on behalf of the Applicant. Said application illustrates the construction of a collapsible container. A loading platform according to the prior art is illustrated for example in document U.S. Pat. No. 4,861,215.

SUMMARY

The object of the present invention is to further contribute to the solution of the aforesaid problem by providing a convertible loading platform, which can be used for transport on wheels and for transport on rails.

Such an object is achieved by a loading platform according to the independent claim. The dependent claims describe alternative embodiments of the invention.

BRIEF DESCRIPTION OF THE DRAWINGS

The features and the advantages of the loading platform according to the present invention will appear more clearly from the following description, made by way of an indicative and non-limiting example with reference to the accompanying figures, in which.

Figure 1:
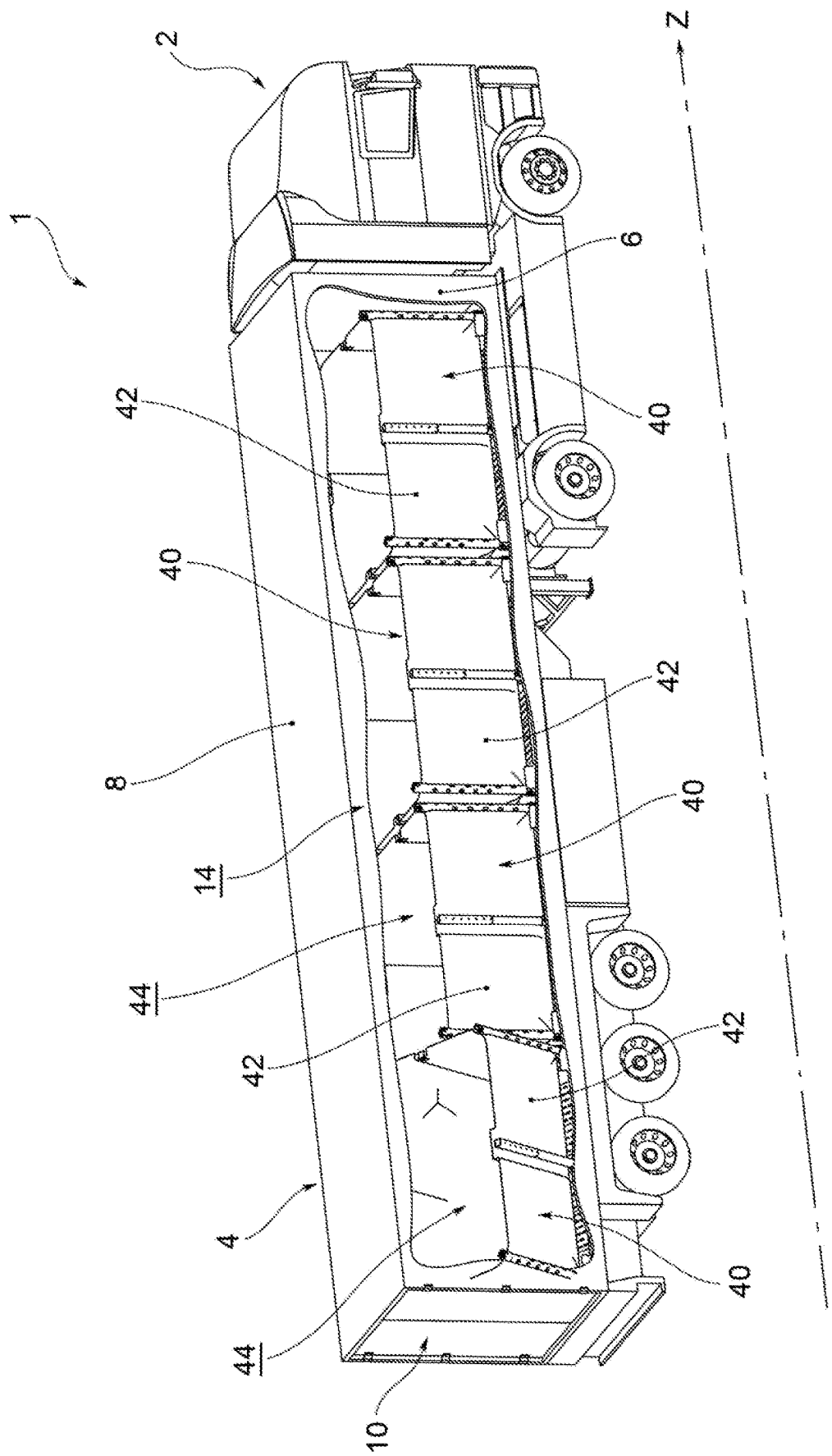
FIG. 1 illustrates a vehicle for transport on wheels, provided with a loading platform according to the present invention.
Figure 1A:
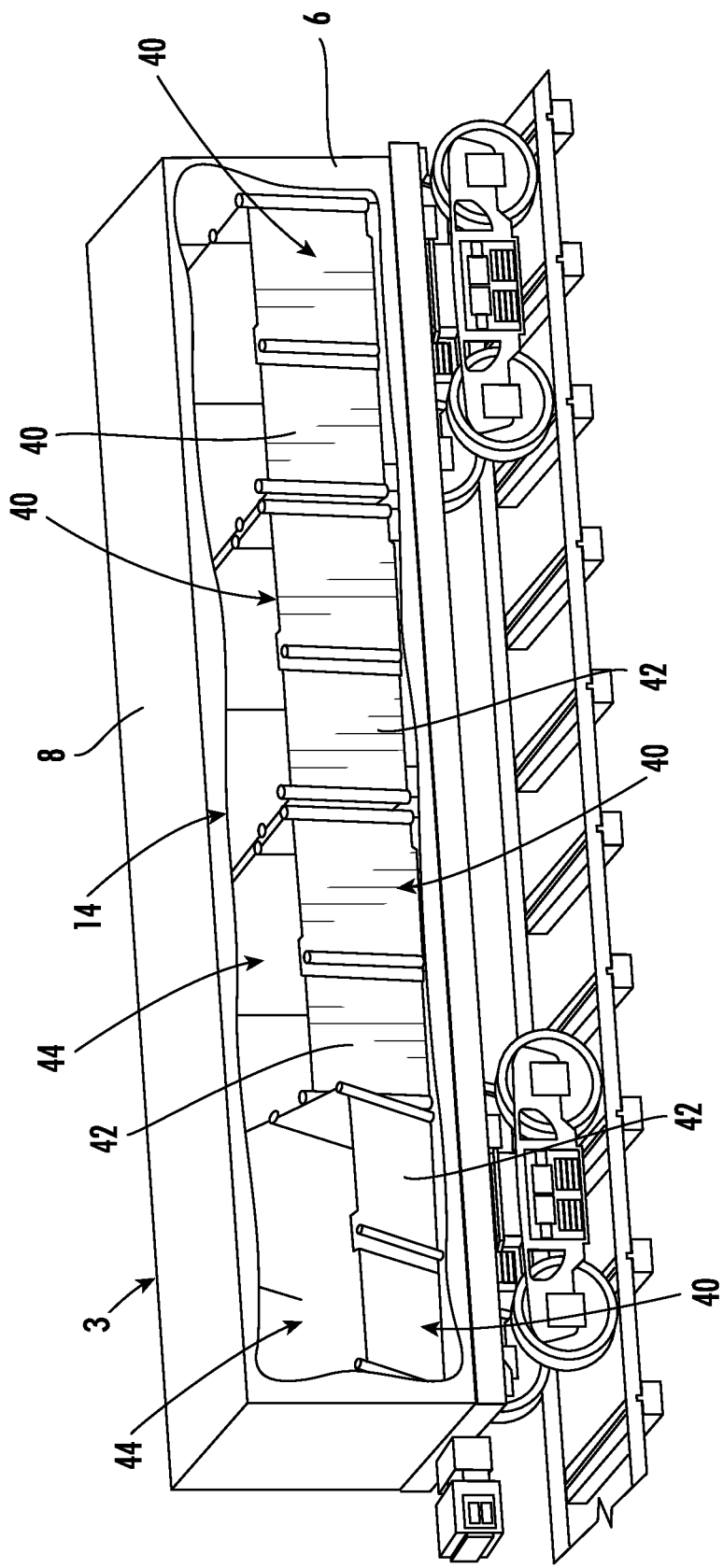

For the sake of clarity of description, reference will be made hereinafter to a vehicle for transport on wheels, but the invention is also applicable to railway wagons 3 for the transport of goods on rails, as depicted in FIG. 1A.

FIG. 1A illustrates a vehicle for transport on rails, provided with a loading platform according to the present invention;

With reference to the accompanying drawings, reference numeral 1 indicates a vehicle for goods transportation on wheels, for example a truck designed to move along a direction of travel Z, provided with a tractor 2 and a trailer 4 connected to the tractor 2 (FIG. 1).

The trailer 2 is for example of the closed type, that is, provided with side walls 6 (frames), a roof 8 and rear access doors 10, which together define an internal loading space 14, which extends along the direction of travel z from the rear area, where the access doors 10 are to the front area where the tractor 2 is located.

Inside the loading compartment 14, at least one loading device 16 and preferably several loading devices 16 are arranged, integrated with a main trailer frame, arranged in succession, side by side along the direction of travel Z.

Said loading devices 16 and the main frame to which they are attached form a loading platform for the vehicle 1.

Each loading device 16 (FIGS. 2 and 3) comprises a support base 18, for example perforated, inside a peripheral edge, for example rectangular, defined by longitudinal sections 20 and transverse sections 22.

When the loading device 16 is mounted in the loading compartment 14, the longitudinal sections 20 are parallel to the direction of travel Z.

The loading device 16 further comprises a plurality of columns 24 connected, for example hinged, to the peripheral edge of the support base 18 so as to be retractable.

Figure 2:
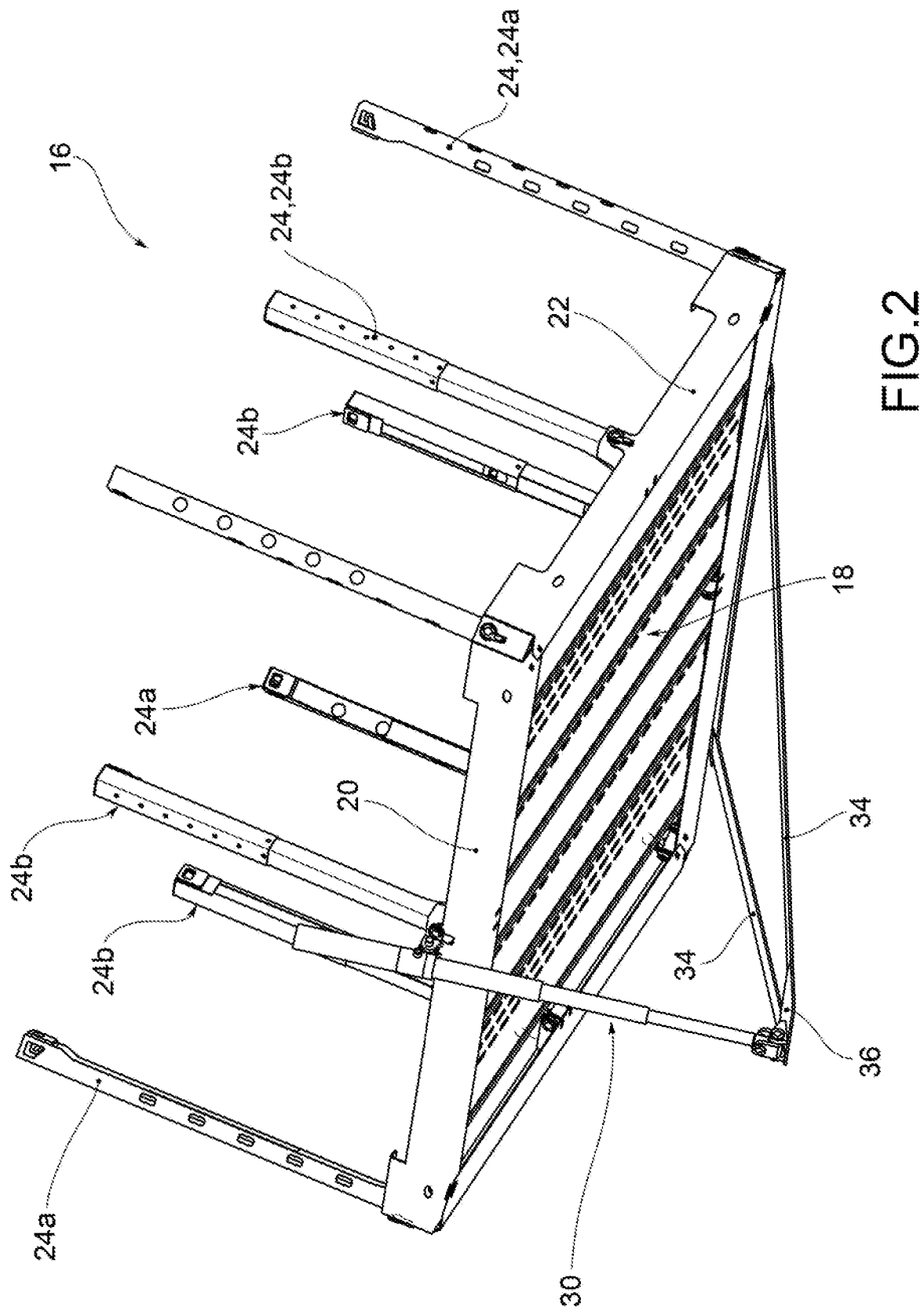
FIG. 2 shows a loading device of the loading platform in FIG. 1, in a configuration for unloading the bulk material.
Figure 3:
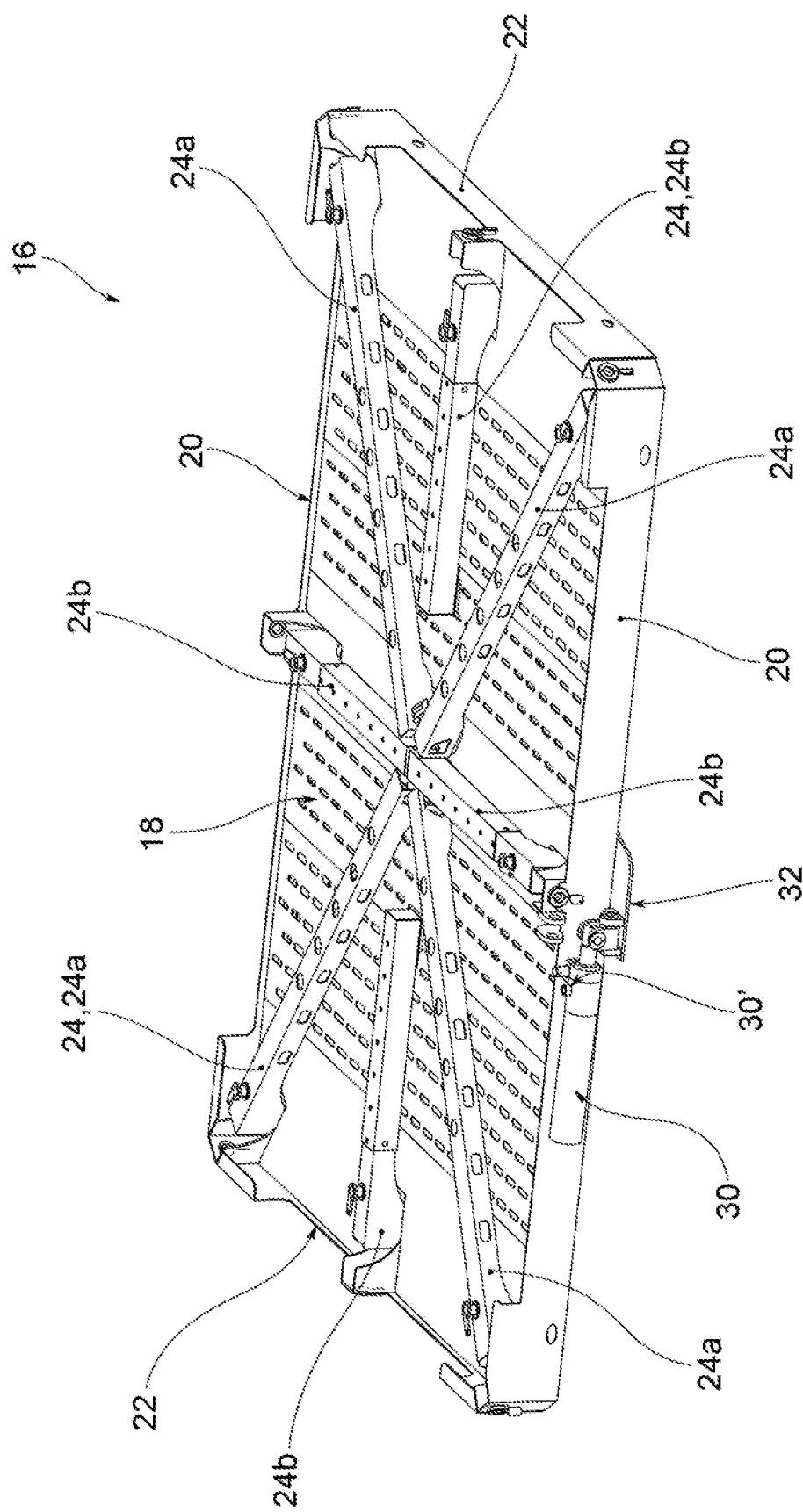
FIG. 3 shows the loading device in FIG. 2 in a retracted configuration.

Columns 24 are for example rotatable to move from a working position, in which they are vertically arranged (FIG. 2) to a rest position, in which they are arranged in plane with the support base 18 (FIG. 3).

For example, the loading device 16 comprises four columns 24a arranged at the corners of the peripheral edge of the support base 18 and four columns 24b arranged at the center line of the longitudinal sections 20 and of the transverse sections 22.

In particular, the columns 24 are rotatable towards the inside of the support base 18, i.e. inside the peripheral edge of said support base 18.

DETAILED DESCRIPTION OF THE PREFERRED EMBODIMENTS

For example, when placed in the rest position, the columns 24 extend along directions converging towards the geometric center of the support base 18.

Preferably, the loading device 16 comprises locking means suitable for locking the columns 24 in the working position.

Moreover, the loading device 16 comprises tipping means adapted to be operated for tipping the support base 18 from a substantially horizontal initial position (FIG. 3) to an unloading position, inclined with respect to the initial position (FIG. 2)

Said tilting means comprise at least one linear actuator 30, preferably telescopic, for example with three stages, applied in a predefined position of the peripheral edge of the support base 18.

For example, the linear actuator 30 is located along one of the two longitudinal sections 20 of the peripheral edge, for example at the center line.

For example, preferably, said tipping means comprise a fixed support 32, to which the linear actuator is hinged, at a first end; at the other end, the linear actuator 30 may be engaged with the peripheral edge of the support base.

In this way, the linear actuator 30 is rotatable between a rest position, in which it is disengaged from the peripheral edge (FIG. 3) and for example is lying, for example horizontally along the direction of the longitudinal section, and a working position, in which it is raised and engageable with the peripheral edge (FIG. 2).

Having placed the linear actuator in the working position and engaged with the peripheral edge of the support base 18, the actuation of said linear actuator leads to the lifting of the support base 18, on the side where the actuator is located, allowing the discharge of the bulk material on the opposite side.

Preferably, the tipping means comprise a pair of straps 34, located below the support base 18, converging to a respective end in a region 36 in which the support 32 for the linear actuator is fixed, and at the other end fixed to the peripheral edge, to the section opposite that to which the linear actuator is fixed.

The linear actuator 30 may be actuated fluidically, for example, pneumatically. For example, the vehicle 1 is provided with a system for the generation and distribution of pressurized air, comprising flexible supply tubes, and the linear actuator 30 is provided with a fitting 30' for connecting said tube.

According to an embodiment variant, the linear actuator 30 is electrically operable.

Moreover, each loading device 16 comprises a collapsible container 40 or bag, for example made of fabric or other foldable material, for example made of Kevlar, consisting of a bottom and a side wall 42, such as to make an inner volume 44 for loading the bulk material.

The bottom of the bag 40 is arranged to cover the support base 18, while the side wall 42 is supported by the columns 24, for example connected thereto.

When the columns 24 are in the working position, the volume 44 inside the bag is available for loading the bulk material; on the contrary, when the columns 24 are retracted in the rest position, the bag is collapsed and occupies a minimum space above the support base 18.

The bag 40 is further provided with unloading openings 46, for example along the longitudinal section 20 of the support base 18, near the bottom, which can be opened for the outflow of the bulk material.

Figure 4:
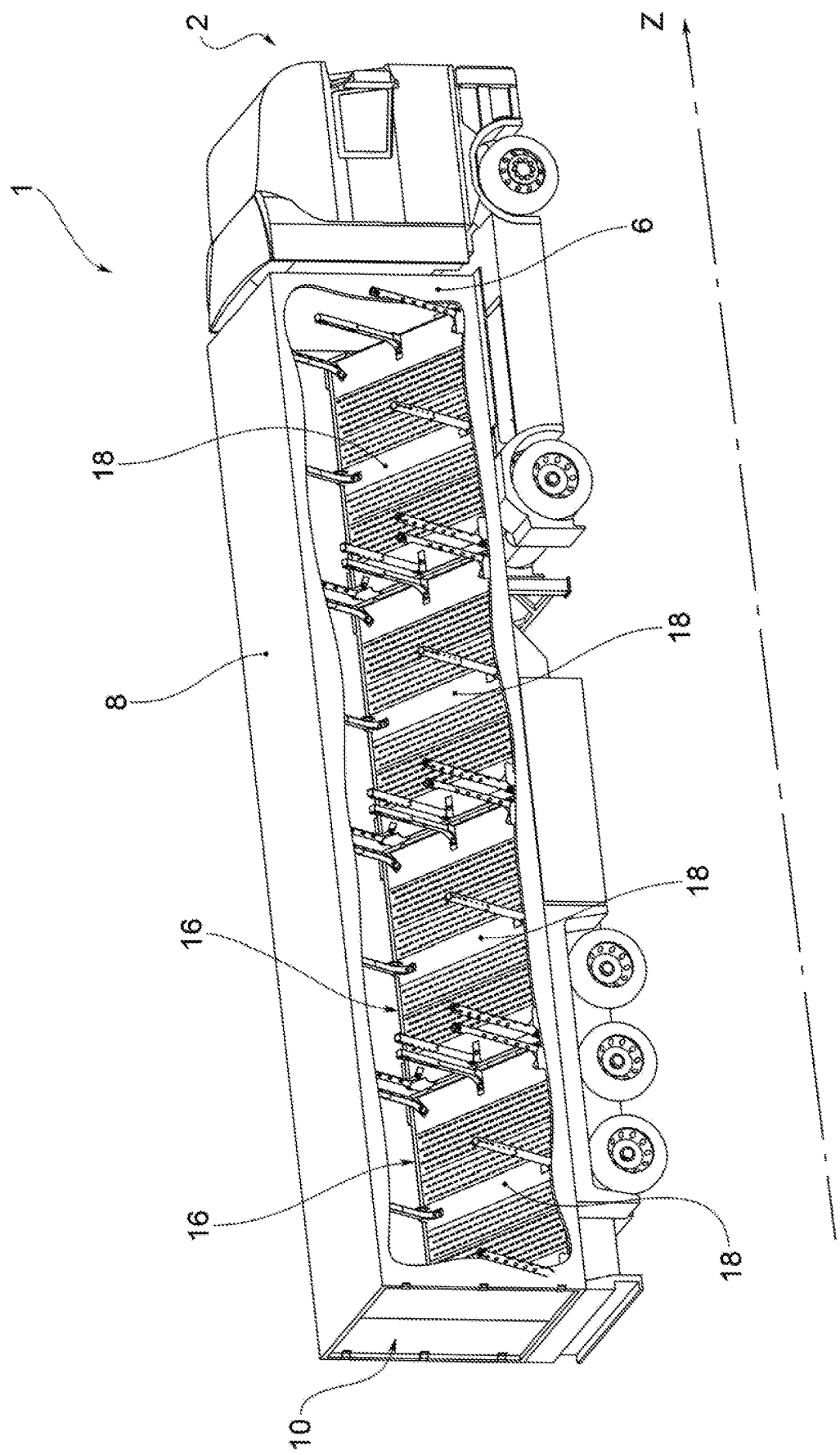
FIG. 4 shows the vehicle in FIG. 1, in a configuration for unloading the bulk material.

For unloading the bulk material, starting from a transport configuration (FIG. 1), it is sufficient to operate, for example one at a time, the tipping means, for example the actuators 30, so as to switch to an unloading configuration (FIG. 4), in which the support bases 18 are inclined, thus allowing the material to escape from the openings 46 of the bag, placed on the side of the longitudinal section 20 opposite that to which the linear actuator 30 is connected.

According to a preferred embodiment, each loading device 16 comprises at least two opposing support plates 50.

Each support plate 50, having a longitudinal extension equal to the longitudinal extension of the support base 18, is preferably made of wood.

Figure 5:
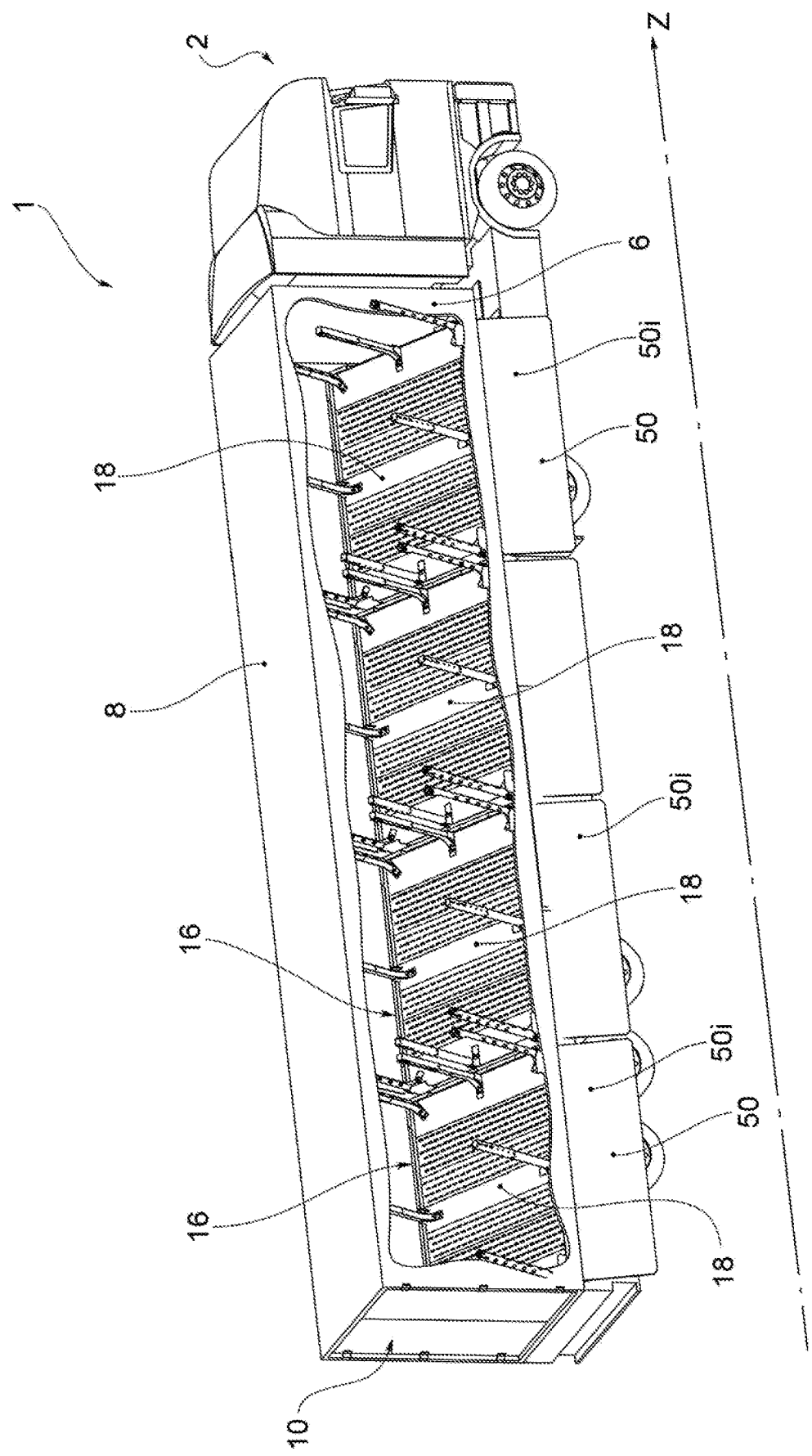
FIG. 5 shows a vehicle with a support platform, in a configuration for unloading the bulk material, according to a further embodiment of the invention.
Figure 6:
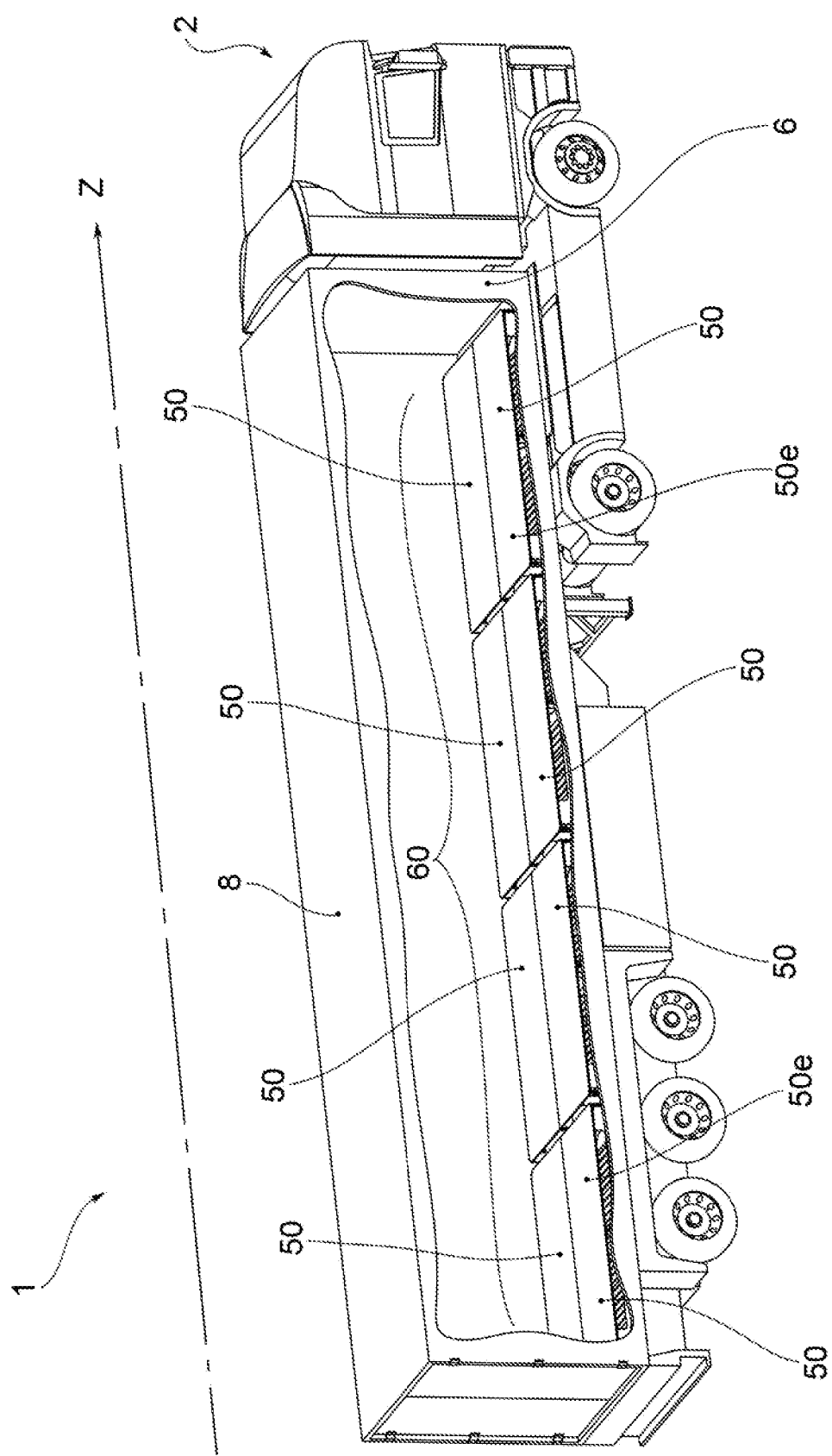
FIG. 6 shows the vehicle in FIG. 5, in a configuration for loading goods in packages.

Preferably, said support plate 50 is hinged to the respective longitudinal section 20, so as to be rotatable between an unloading position (FIG. 5), in which it protrudes from the loading compartment 14 forming a slide, and a rest position in which it is applied to the columns 24 of the loading device 16, acting as a lateral reinforcement for the bag 40.

In this embodiment, when the loading device 16 is brought in the retracted configuration (FIG. 3), the support plates 50 collectively form a loading platform 60 for the loading compartment 14.

Advantageously, said loading platform 60 is suitable for loading goods, for example organized in packages or in other forms.

When the support plate 50 is applied to the columns 24, it has an outer surface 50e facing the external environment and an inner surface 50i, facing the inner volume 44 of the loading device 16.

According to a preferred embodiment, the inner surface 50i of the support plate 50 is shaped to reflect in negative the shape of the columns 24 in the retracted configuration.

In this way, in said retracted configuration, each support plate 50 forms a shape coupling with the shapes of the columns, thus forming a very stable and resistant support for the goods.

According to a further embodiment, the inner surface 50i is provided with reinforcing elements, for example reinforcing beams.

Preferably, the base plate, the peripheral edge and the columns are made of steel; according to an embodiment variant, they are made of aluminum alloy.

Figure 7:
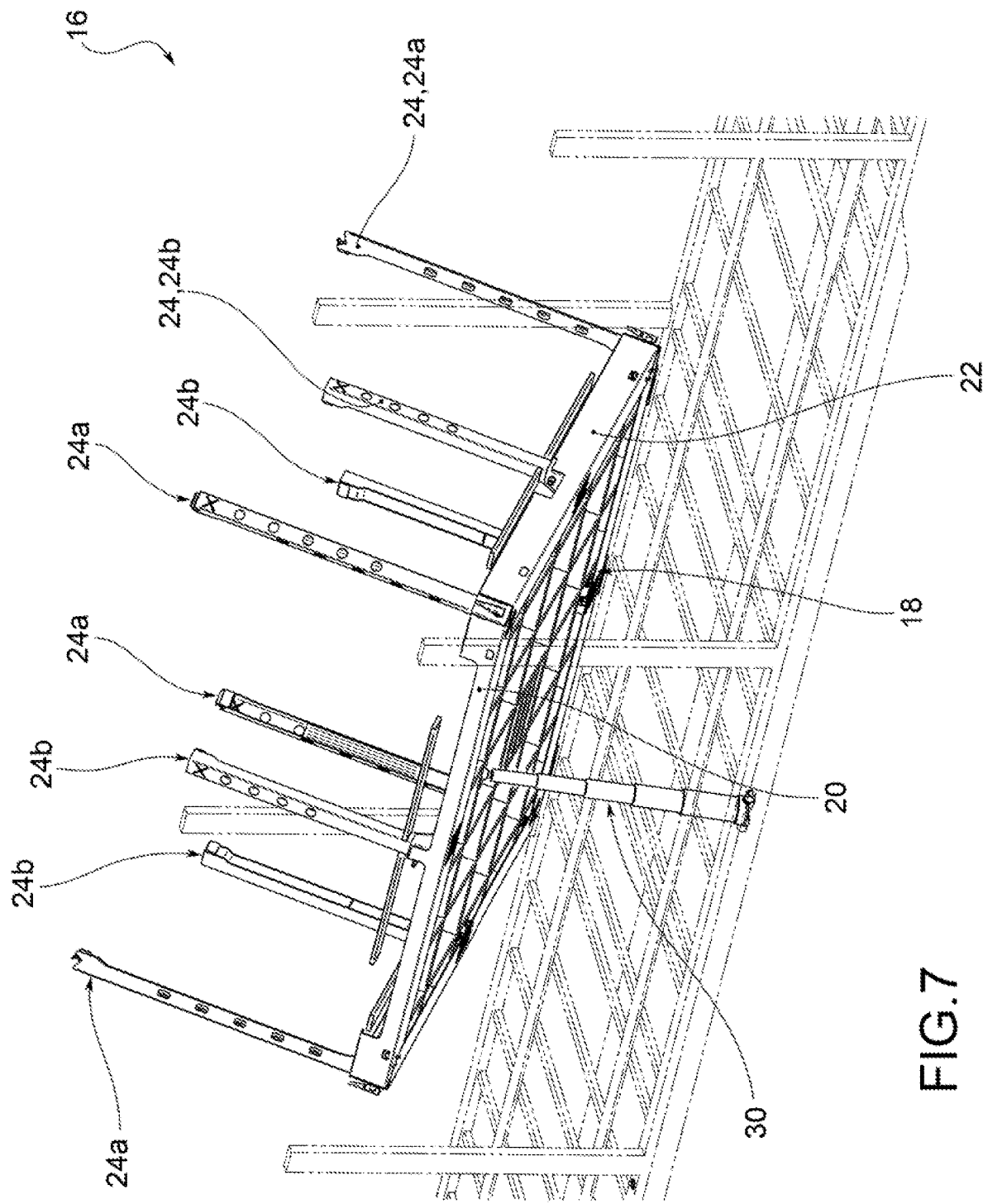
FIG. 7 shows the loading device, in a configuration for unloading the bulk material, according to a further embodiment of the invention.

According to an embodiment (FIG. 7), the telescopic linear actuator 30 is hinged at one end to a longitudinal member of the main frame and at the other end to the support base 18.

Figure 8:
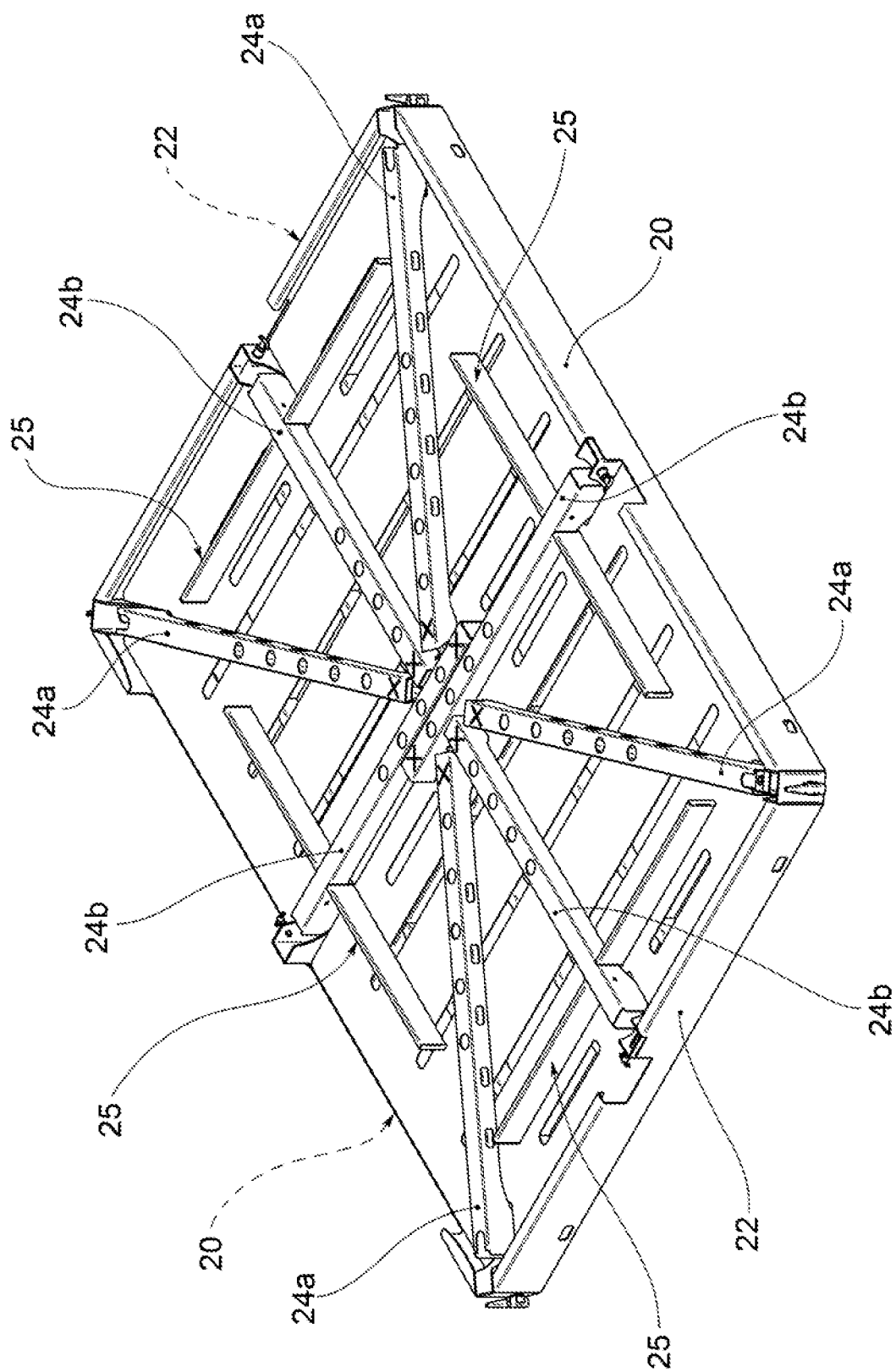
FIG. 8 shows the loading device according to a further embodiment of the invention, in the retracted configuration.

According to a further embodiment (FIG. 8), at least one of the columns 24b arranged at the center line of the longitudinal sections 20 and of the transverse sections 22 are provided with a crosspiece 25, extending transversely with respect to the relative column 24b, arranged along the height of said columns 24b, preferably in the lower half, for example in the vicinity of the foot of the column.

Advantageously, when the columns 24 are in the working position, said crosspieces 25 provide containment means adapted to contain the deformation of the side wall of the collapsible container (so-called "spilling").

Equally advantageously, when the columns 24 are in the rest position, said crosspieces constitute further supports for the support plates which form the loading platform.

Figure 9:
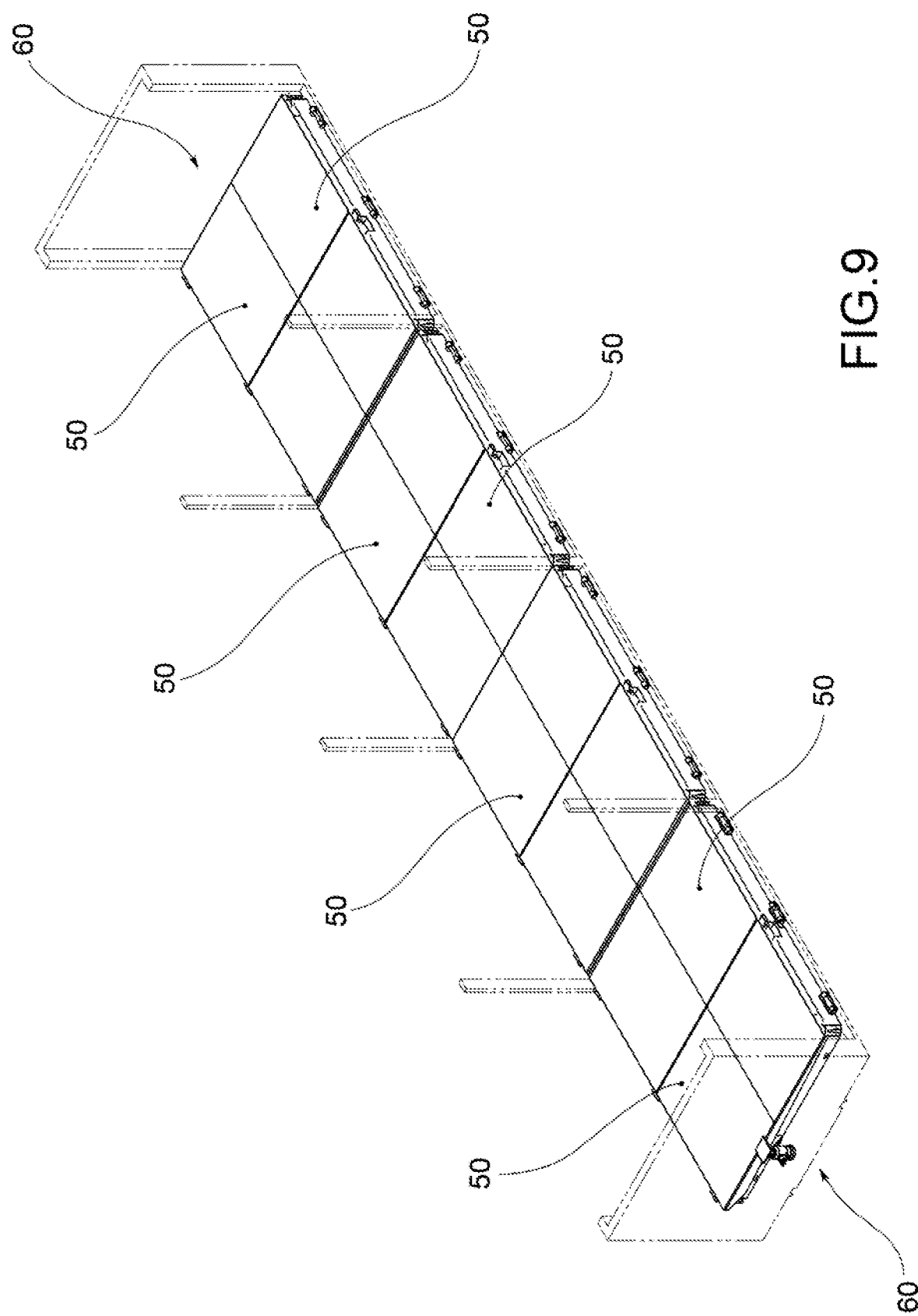
FIG. 9 shows the loading platform with a support platform, according to a further embodiment of the invention, in a configuration for loading goods in packages.
Figure 10:
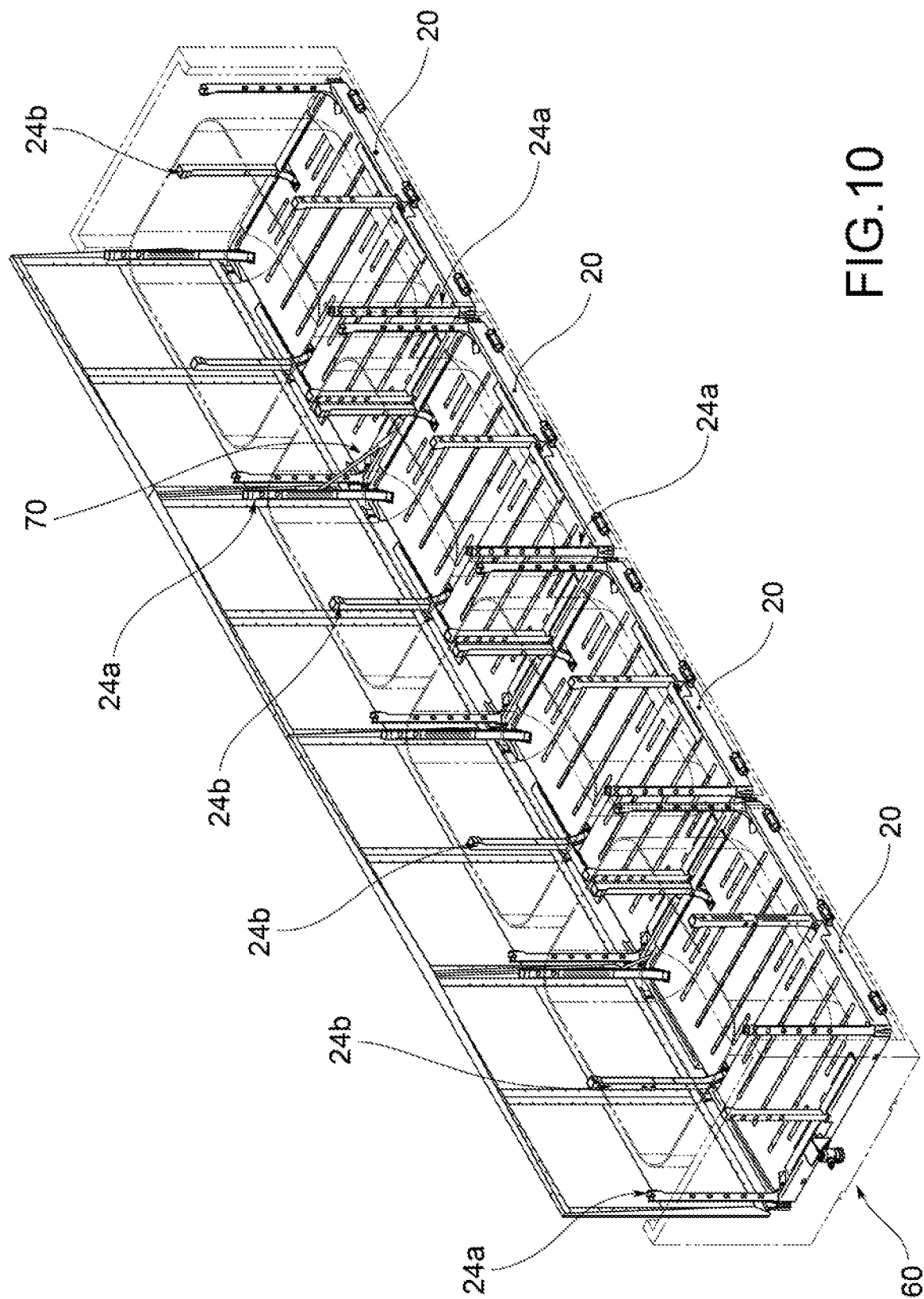
FIG. 10 shows the loading platform in FIG. 9 with a support platform in a raised configuration.
Figure 11:
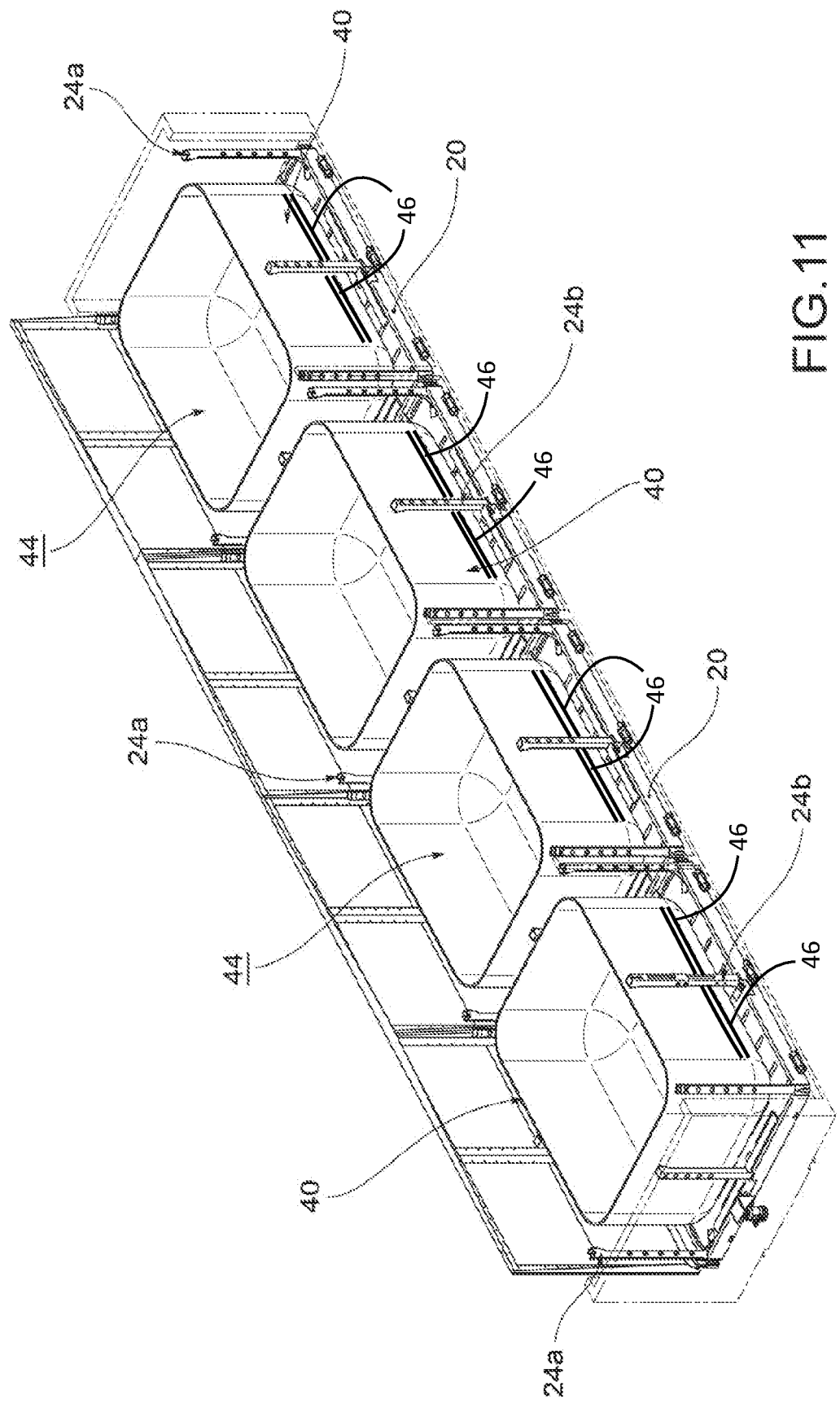
FIG. 11 shows the loading platform in FIG. 10 with a support platform in the raised configuration and containers for loading bulk goods.

According to a still further embodiment (FIGS. 9 to 11), the loading platform 60 may be lifted automatically, for example by one or more linear actuators 70, preferably oleodynamic, for example arranged between one loading device 16 and the next.

Innovatively, the vehicle according to the present invention, both for transport on wheels and for transport on rails, further contributes to the solution of the problem posed, since it allows transporting both goods organized in packages and bulk materials, and effectively unloading the bulk material.

It is clear that a man skilled in the art may make changes to the vehicle described above in order to meet incidental needs, all falling within the scope of protection defined in the following claims.

The invention claimed is:

1. A convertible loading platform for a vehicle for goods transportation on wheels or on rails, comprising:
   a main frame extending mainly along a direction of travel;
   at least one loading device, integrated with the main frame; wherein said at least one loading device comprises:
   i) a support base having a peripheral edge comprising longitudinal sections in the direction of travel and transverse sections;
   ii) a plurality of retractable columns connected to the peripheral edge of the support base;
   iii) a collapsible container supported by the columns;
   iv) tipping means, comprising at least one linear actuator hingedly attached to the support base, adapted to be actuated to tilt the support base so as to cause the outflow of bulk material contained in the collapsible container from a side of one of said longitudinal sections, and
   v) a support plate, having a length and a width generally equal to a length and a width of the support base and hinged to a respective longitudinal section so as to be rotatable between a first position and a second position in which, when the columns are retracted and the container is collapsed, the support plate covers the at least one loading device, forming a loading platform, suitable for loading goods thereon.

2. The convertible loading platform according to claim 1, wherein said columns are hinged to the peripheral edge of the support base.

3. The convertible loading platform according to claim 1, wherein a plurality of loading devices is provided, side-by-side along the direction of travel.

4. The convertible loading platform according to claim 1, wherein the at least one linear actuator is positioned opposite the side on which the outflow of material occurs.

5. The convertible loading platform according to claim 1, wherein the at least one linear actuator can be releasably engaged with the support base.

6. The convertible loading platform according to claim 1, wherein the at least one linear actuator is rotatable between a rest position, in which it is disengaged from the peripheral edge and is lying horizontally along the direction of the longitudinal sections, and a working position, in which it is raised and engagable with the peripheral edge.

7. The convertible loading platform according to claim 1, wherein the at least one linear actuator is fluidically actuatable and is provided with a fitting for connecting to a pressurized air supply tube.

8. The convertible loading platform according to claim 1, wherein the columns are hinged and rotatable to move from a working position, in which they are vertically arranged to a rest position, in which they are arranged in plane with the support base.

9. The convertible loading platform according to claim 8, wherein the columns are rotatable towards an interior of the peripheral edge of the support base.

10. The convertible loading platform according to claim 8, wherein at least one column of the plurality of columns is provided with a crosspiece having a transversal extension with respect to that an extension of the at least one column of the plurality of columns, said crosspiece being configured to contain the collapsible container.

11. The convertible loading platform according to claim 1, wherein the container is provided with unloading openings along the longitudinal sections, which may be opened for the outflow of the bulk material.

12. A trailer for transport on wheels, comprising a convertible loading platform according to claim 1.

13. A railway wagon for rail transport, comprising a convertible loading platform according to claim 1.

* * * * *